United States Patent [19]

Takenaka et al.

[11] 4,407,513
[45] Oct. 4, 1983

[54] MECHANICAL SEAL

[75] Inventors: Akira Takenaka; Tatsuhiko Fukuoka, both of Toyota, Japan

[73] Assignee: Taiho Kogyo Co., Ltd., Toyota, Japan

[21] Appl. No.: 366,810

[22] Filed: Apr. 8, 1982

Related U.S. Application Data

[60] Continuation of Ser. No. 123,625, Feb. 22, 1980, abandoned, which is a division of Ser. No. 895,072, Apr. 10, 1978, abandoned.

[30] Foreign Application Priority Data

| Apr. 12, 1977 [JP] | Japan | 52-41838 |
| Mar. 3, 1978 [JP] | Japan | 53-24137 |
| Mar. 3, 1978 [53] | 4138 | JPX |

[51] Int. Cl.³ .............................. F16J 15/34
[52] U.S. Cl. ........................... 277/96.1; 277/92
[58] Field of Search .................. 277/92, 96, 96.1

[56] References Cited

U.S. PATENT DOCUMENTS

| 3,540,743 | 11/1970 | Ashton | 277/92 |
| 3,744,805 | 7/1973 | Heinrich | 277/96 |
| 4,099,729 | 4/1978 | Nylykke | 277/96.1 |

*Primary Examiner*—Robert I. Smith
*Attorney, Agent, or Firm*—Flynn, Thiel, Boutell & Tanis

[57] ABSTRACT

A mechanical seal for preventing the leakage of fluid through the rotary sliding contact surfaces, in which a contact surface is provided with a plurality of fine one-way grooves having outer closed end portions. The fine grooves which are inclined outwardly and rearwardly to the relative rotation can be formed in the sliding contact surface of either the rotating member or the stationary member. If the fine grooves are formed radially or inclined outwardly and forwardly, the fine grooves may be formed in the sliding contact surface of the rotating member. The mechanical seal having such fine grooves in the sliding contact surface gives a quite good sealing effect because, during the rotation of rotating members, the leakage flow of the pressurized fluid or a mixture of liquid and gas that is sealed in on the outside thereof toward the external gas existing on the inside thereof, can be avoided. In another embodiment of the above mechanical seal having the fine grooves, the peripheral portion of at least one sliding contact surface is somewhat raised in the direction of the axis of the rotary shaft so as to increase the contact pressure between the contact surfaces, thereby enhancing the sealing effect during the stoppage of the rotating members. Therefore, the sealing effect in all the use conditions can be much improved.

9 Claims, 19 Drawing Figures

NUMBER OF ROTATION: 6000 r.p.m
INTERNAL PRESSURE: 3kg/cm²
NUMBER OF GROOVES: 8

FIG. 10

NUMBER OF GROOVES: 8
WIDTH OF GROOVE: 0.3 mm

DEPTH OF GROOVE
---o---o 0.05 mm
———•——— 0.2 mm
———△——— 1.0 mm

FIG. 11

NUMBER OF GROOVES: 8
DEPTH OF GROOVE 0.2 mm

WIDTH OF GROOVE
- - -o- - -o- - - 1.0 mm
———•———•——— 0.2 mm
——△———△—— 0.6 mm

NUMBER OF ROTATION: 6000 r.p.m
INTERNAL PRESSURE: 3 kg/cm$^2$

FIG. 12

NUMBER OF GROOVES: 8
WIDTH OF GROOVE: 0.3mm
DEPTH OF GROOVE: 0.2mm

INCLINATION OF GROOVE
- ---o---o--- a
- —●—●— b
- —△—△— c

NUMBER OF ROTATION: 6000rpm
INTERNAL PRESSURE: 3kg/cm²

FIG. 13

NUMBER OF GROOVES: 8
DEPTH OF GROOVE: 0.2 mm
WIDTH OF GROOVE: 0.3 mm

CONDITIONS OF USE

—o—o— NUMBER OF ROTATION: 1000 r.p.m.
INTERNAL PRESSURE: 3kg/cm²

—•—•— NUMBER OF ROTATION: 6000 r.p.m.
INTERNAL PRESSURE: 3kg/cm²

MECHANICAL SEAL

This is a continuation of application Ser. No. 123,625, filed Feb. 22, 1980, in turn a divisional of application Ser. No. 895,072 filed Apr. 10, 1978 both of which are now abandoned.

BACKGROUND OF THE INVENTION (1) Field of the Invention

This invention relates to an improvement in a mechanical seal which prevents the leakage of fluid through relatively rotatable sliding contact surfaces. There are many sliding contact portions in industrial machinery such as the compressors of car coolers and other pumping and compressing apparatus for fluids. As is well known when considering the operation of a mechanical seal in a car cooler or radiator system, the sealed pressurized fluid is either a liquid or a mixture of a gas and a liquid. In such a prior art system, the sealed pressurized fluid is sealed in on the outside of the seal and an external fluid is disposed on the inside of the seal. It is specifically desired to avoid the leakage flow of the pressurized fluid toward the external gas. The performance of such sliding contact portions has great influence on the durability and reliability of the machines.

(2) Description of the Prior Art

In the ordinary prior art mechanical seal, a follower ring which rotates together with the rotary shaft is brought into sliding contact with a seating ring on the stationary side which is also carried by the rotary shaft. The leakage of a fluid from the outside to the inside of the sliding contact surface is avoided by a mechanical means. In order to improve the sealing effect between the contact surfaces, several countermeasures have been taken. For example, the pressure per unit area between the contact surfaces is increased by intensifying the pressure between the seating ring and the follower ring or durable sealing surfaces are formed by selecting the material of contact surfaces. However, it is impossible to avoid the occurrence of coarseness of the contact surfaces and the wear or other changes of the contact surfaces during prolonged use. Especially in the case of the mechanical seal for the compressor of a car cooler or the like, it is used under severe conditions in which the temperature is varied and vibration is exerted, so that the leakage of fluid is liable to occur. Therefore, radical measures against such defects have long been desired.

BRIEF SUMMARY OF THE INVENTION

In view of the above-described circumstances, the present invention provides the sliding contact surface with fine grooves of a certain form. It has been discovered that radial pressure to resist the leakage flow can be exerted to the fluid interposed in the very thin space between the contact surfaces by utilizing the relative rotary motion of the sliding contact surfaces.

It is, therefore, the primary object of the present invention to provide an improved mechanical seal in which an almost complete sealing film of a fluid is formed between the contact surfaces by their own rotary motion without the necessity of the increase of the contact pressure and the special selection of the material for the contact surfaces.

It is another object of the present invention to provide a mechanical seal having a contact surface or surfaces including fine grooves which are formed and disposed under certain conditions as described below.

It is a further object of the invention to provide a mechanical seal which can be produced without difficulty by forming simple fine grooves on the sliding contact surface and is durable under severe and prolonged use conditions.

It is still a further object of the present invention to provide a mechanical seal which is effective when the rotary members are stopped as well as being effective while operating with relative rotating motion.

BRIEF DESCRIPTION OF THE DRAWINGS

In order that the invention may be more fully understood, preferred embodiments and various supplementary features will now be described with reference to the accompanying drawings, in which:

FIG. 3, FIG. 4 (A) and FIG. 4 (B) are enlarged cross sectional views of modified embodiments of the mechanical seal of FIG. 2;

FIG. 9 (A) and FIG. 9 (B) are side views of the follower rings in which the direction or the angles of the fine grooves are changed;

FIG. 15 (A) and FIG. 15 (B) are exaggerated cross sectional views of the contact surfaces of the follower rings;

DETAILED DESCRIPTION OF THE INVENTION

Referring now to the accompanying drawings, the embodiments of the present invention will be described in detail.

Figure 1:
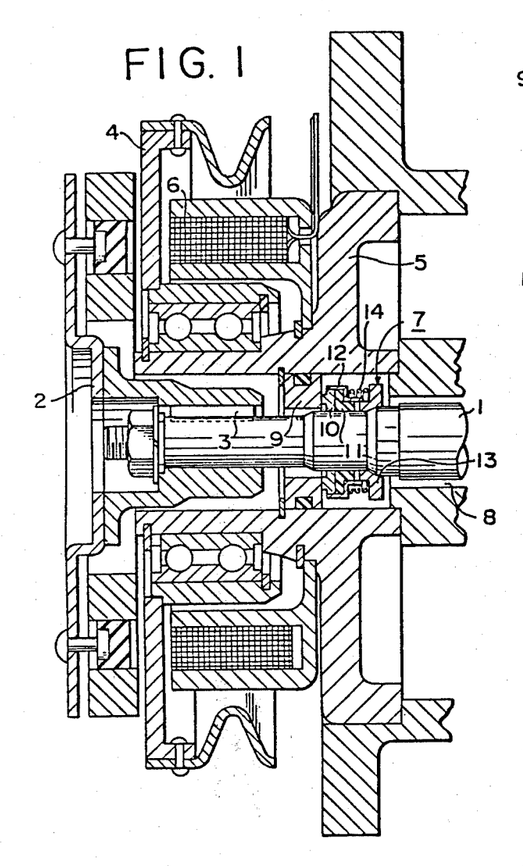
FIG. 1 is a vertical cross sectional view of a rotary shaft which is provided with a mechanical seal of the present invention.

As an example of a rotary shaft having the mechanical seal of the present invention, a part of compressor for an automobile is shown in FIG. 1, wherein, as is known, a pressurized fluid is in the compressor section 8. The rotary shaft 1 of the compressor is provided with a connecting member 2 of an electro-magnetic clutch, which member 2 is axially slidably fitted to the rotary shaft 1 with using a key 3. The rotating member 4 can be rotated relative to the casing 5. Excitation coils 6 are disposed inside the rotating member 4 and when the coils 6 are energized, the rotating member 4 is united with the connecting member 2 so that the rotary shaft 1 is rotated together with the rotating member 4.

The mechanical sealing section 7 prevents leakage of the fluid in the compressor section 8 along rotary shaft 1. A follower ring 10 is slidably engaged with a seating ring 9 which is fitted around the rotary shaft 1. The follower ring 10 is rotated together with the rotary shaft 1 and the leakage of oil or gas through the gap between the rotary shaft 1 and the seating ring 9 can be avoided by the above slidable engagement of the follower ring 10. The package 11 is closely fitted to the rotary shaft 1 via a keep plate 12 for packing 11 and a knock ring 13. The follower ring 10 is urged toward the seating ring 9 by the force of a helical spring 14.

Figure 2:
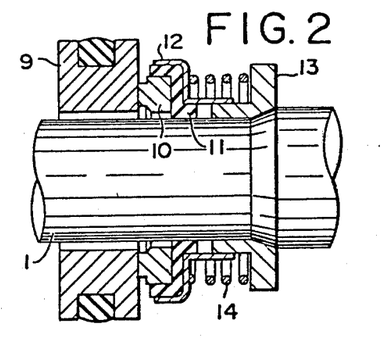
FIG. 2 is an enlarged cross sectional view of the mechanical seal shown in FIG. 1.
Figure 3:
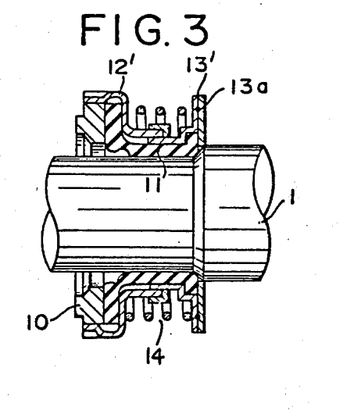
Figure 4:
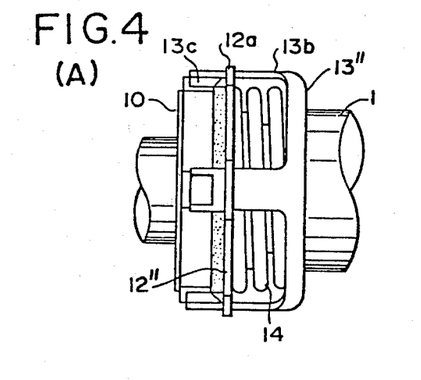

Shown in FIG. 2 is the above-mentioned mechanical sealing section 7 in an enlarged scale. The knock ring 13 shown in FIG. 2 is a relatively thick molded article, while, the knock ring 13' shown in FIG. 3 is the one which is made by bending press work and spot-welding of portion 13a so as to make the product simple and light in weight. FIGS. 4 (A) and (B) are a side view and a cross sectional view, respectively, showing another modified embodiment of the mechanical sealing section 7. The keep plate 12" is formed like a toothed wheel and openings 12a are made in the tooth portions. The knock ring 13" includes a plurality of tongue pieces 13b which extend in parallel to the axis of the shaft 1. Tongue pieces 13b are inserted into openings 12a of keep plate 12", thereby preventing tongue pieces 13b from opening outwardly with respect to shaft 1. Further, the free ends 13c of tongue pieces 13b are firmly attached to the peripheral portions of the follower ring 10 so as to avoid the rotation of the follower ring 10 with respect to shaft 1. This modified embodiment of mechanical sealing section 7 provides improvements in workability, durability and production cost.

The compressor having such a structure is well known to those skilled in the art (e.g. the specifications of U.S. Pat. Nos. 3,057,545; 3,685,923; 3,784,331; 3,801,227; and 3,924,968. It is also well known that the above-mentioned mechanical sealing section 7 confines the sealed pressurized fluid consisting of a mixture of a lubricant oil and a refrigerant gas within the inside of the compressor, that is, within the outside of the sliding contact surfaces of the mechanical sealing section 7 which thereby prevents the fluid leakage from the outside of the above sliding contact surfaces to the inside air, that is, the outside of the compressor.

With any of the above embodiments, however, it is impossible to prevent the leakage completely in the mechanical sealing section of the compressor of a car cooler which is used under severe conditions with vibration and change of temperatures.

Figure 5:
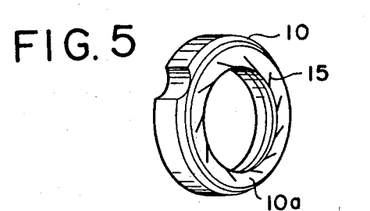
FIG. 5 is a perspective view of a follower ring of the present invention.

In accordance with the present invention, quite good sealing effect can be attained by forming fine grooves 15 in the sliding surface 10a of the follower ring 10 as shown in, for example, FIG. 5.

Figure 6:
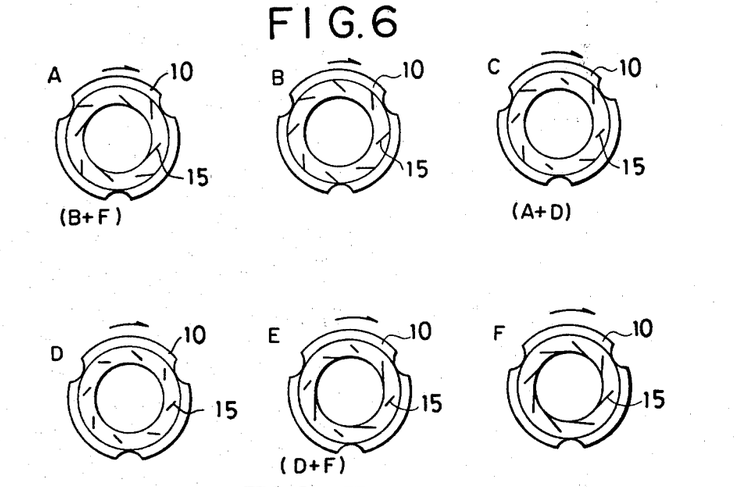
FIG. 6 is a schematic illustration of side views of the follower rings as shown in FIG. 5, in which desirable and undesirable embodiments of the fine grooves formed on the follower rings are shown.

More particularly, in FIG. 6 are shown several kinds of the fine grooves 15 that are formed in the sealing end faces and are inclined outwardly and rearwardly to the relative rotation between the follower ring 10 and seating ring 9 as indicated by the arrows. The follower ring 10 shown in FIG. 6 (A) includes outwardly outwardly communicating grooves and inwardly communicating grooves that are disposed one after the other. The follower ring 10 shown in FIG. 6 (B) has all outwardly communicating grooves. The follower ring 10 in FIG. 6 (C) has outwardly communicating grooves and closed grooves. The fine grooves 15 of the follower ring 10 shown in FIG. 6 (D) are all closed grooves. The follower ring 10 shown in FIG. 6 (E) has inwardly communicating grooves and closed grooves that are disposed by turns. The last embodiment of the follower ring 10 shown in FIG. 6 (F) includes all inwardly communicating grooves 15.

The follower rings 10 as shown in FIG. 6 were prepared with 8 grooves or 24 grooves. These follower rings 10 were subjected to oil leakage tests under severe conditions of the number of rotation of 6,000 r.p.m. and the internal pressure of 3 kg/cm$^2$ the results of these tests are shown in the accompanying FIGS. 7 and 8. According to the test results, the leakages in the cases of FIG. 6 (A), (B) and (C) are all larger than that of the follower ring without groove, however, in the cases of FIG. 6 (D), (E) and (F), especially in (E) and (F), almost complete sealing effect can be attained. Further, the sealing effect is improved by increasing the number of the grooves. In other words, the outwardly communicating grooves, in any combinations, increase the leakage, while the inwardly communicating grooves give quite excellent sealing effect. Even though the closed grooves are somewhat inferior to the inwardly communicating grooves, they show considerably good sealing effect.

The outwardly communicating grooves introduce leakage flow therein thereby reducing the sealing effect. Further, it is somewhat difficult to introduce fluid into the closed grooves. For this reason the sealing effect of the closed grooves is believed inferior to that of the inwardly communicating grooves. Still further, the above outwardly communicating grooves are also undesirable since they allow the incoming of the leakage flow during the stoppage of rotation. Accordingly, it is required that the outside of these fine grooves 15 must be closed.

The functions of the fine grooves in FIGS. 6 D, 6 E and 6 F will be described. The disposition of grooves 15 as shown is effective to produce a pumping function useful to prevent leakage. The sealed pressurized fluid on the outside of the sliding contact surfaces tends to flow through the clearance in the peripheral portion of the sliding contact surfaces in which no fine grooves 15 are formed. Further, the fluid tends to leak into the air on the inside of the sliding contact surfaces through the clearance in the inner portion between the sliding contact surfaces having fine grooves 15. In this procedure, the lubricant oil in the pressurized fluid passing through the clearance in the inner portion is caught by the fine grooves which are defined in such inner portion. The thus caught lubricant oil is pushed back to the peripheral portion having no fine grooves owing to the pumping function of the fine grooves 15 by the relative rotation between the ring members 9 and 10. Thus, a pressure is caused to occur in the clearance in the peripheral portion, and resists the fluid pressure on the outside of the sliding contact surfaces. Consequently, the pressure prevents the sealed pressurized fluid from leaking to the side of the air on the inside of the sliding contact surfaces.

The mechanism of the above pumping function by the fine grooves 15 has not been understood completely. However, the pumping function is believed to be as follows. The lubricant oil caught in the fine grooves 15 has a certain viscosity. Thus, the lubricant oil in fine grooves 15 is inclined to cling to the surface of seating ring 9 by its own viscosity, even when follower ring 10 having fine grooves 15 is rotated relative to seating ring 9. Therefore, a certain force of action is caused to occur in the lubricant oil contained in fine grooves 15 due to its own viscosity and the relative rotation of rings 9 and 10. The force of action moves the lubricant oil in fine grooves 15 in the easier direction of movement, that is, to the side of the closed outer end portions of fine grooves 15. Such a function is effected continuously during the relative rotation between ring members 9 and 10. Thus, lubricant oil caught in fine grooves 15 is continuously pushed back and the resultant resistant pressure is effective to resist the pressure of the fluid on the outside of the sliding contact surfaces in the clearance within the region of the peripheral portion as discussed above. Accordingly, fine grooves 15 are inclined outwardly and rearwardly to the direction of the relative rotation of sliding contact surfaces, as shown in FIGS. 5 and 6. These inclined fine grooves 15 can be formed not only in the side face of the follower ring 10 but also in the side face of the seating ring 9 to provide the similar effect.

Figure 8:
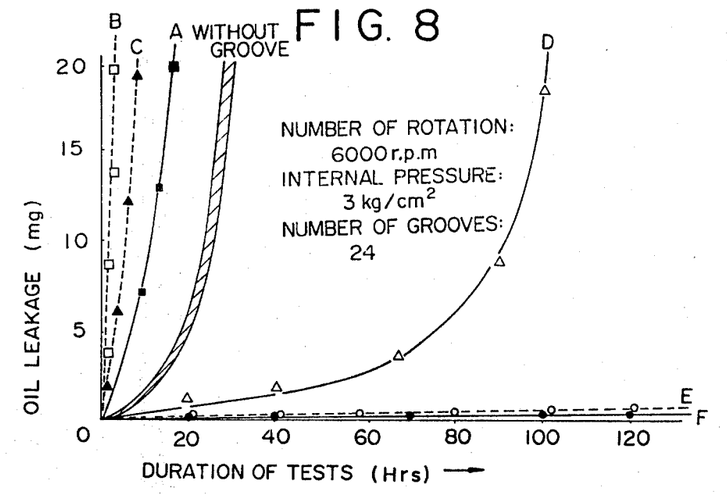
Figure 9:
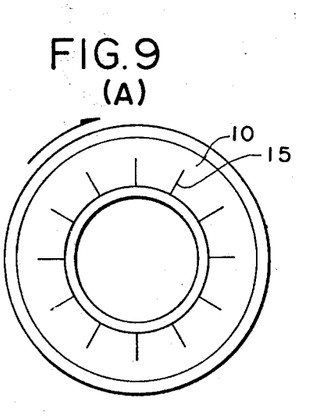

In accordance with further investigation of the invention, with fine grooves 15 disposed radially of follower ring 10 as shown in FIG. 9 (A), almost the same sealing effect can be expected. Further, according to the conditions of use, even when fine grooves 15 are inclined in the opposite direction, that is, outwardly and forwardly, by an angle α (for example, about 5°) as shown in FIG. 9 (B), substantial sealing effect can be obtained without any practical disadvantage. When fine grooves 15 are formed in this manner, the above-described pumping function cannot be obtained. To the contrary, the pumping function is effected in a direction which actually causes the leakage of the lubricant oil. However, when fine grooves 15 are defined on the side of the follower ring 10 within a certain critical angle of the inclination, the centrifugal force to the fluid in the grooves 15 causes radial pressure which resists the leakage of the lubricant oil. Accordingly, when fine grooves 15, defined in follower ring 10, are inclined rearwardly in the direction of rotation, both the centrifugal force and the above-described pumping function can be effected, which is advantageous in the prevention of leakage. This critical angle of the inclination, that is, the angle between the radial direction and a fine groove 15 which is inclined outwardly and forwardly with respect to the relative rotation between ring 10 and seating ring 9, is indicated with a reference symbol α in FIG. 9 (B). This inclination angle α varies according to several conditions such as the rate of rotation of the follower ring 10, the finished condition of the sliding surface, the internal pressure, the viscosity of the fluid held on the sliding surface, the contact pressure between the follower ring 10 and the seating ring 9 and so forth. Therefore, it is quite difficult to specify the angle that it must be generally less than a certain angle. For example, even when the above critical angle α is 10° at a rate of rotation of 3,000 r.p.m., there is a possibility that the critical angle α becomes 5° when the rate of rotation is changed to 1,500 r.p.m. Generally speaking, accordingly, the critical inclination angle of the fine groove 15 is the angle in which the centrifugal force caused in the fluid contained in the fine grooves can resist the pressure of leakage. In this connection, the follower ring (having 12 grooves) as shown in FIG. 9 (B) was subjected to leakage test just like the tests shown by FIGS. 7 and 8 under the conditions of the internal pressure of 3 kg/cm² and the rate of rotation of 6,000 r.p.m. When the above angle α was about 5°, the sealing effect that is equal to the above tests on the radial fine grooves could be obtained, however, when the angle was further increased, the effect was abruptly reduced.

As described above, the direction of the fine grooves has the degree of freedom. However, in order to attain the largest sealing effect, the fine grooves formed in the sliding surface may be inclined outwardly and rearwardly to the direction of relative rotation, especially, when such an inclination angle comes within the range of 45° to 90°, the most preferable result can be obtained. In other cases, the effect of mechanical sealing varies widely according to the conditions of sealing and operation.

With regard to the above-described fine grooves 15, the configurations, number and other conditions will be studied in the following.

(i) Width and depth of fine grooves

Figure 10:
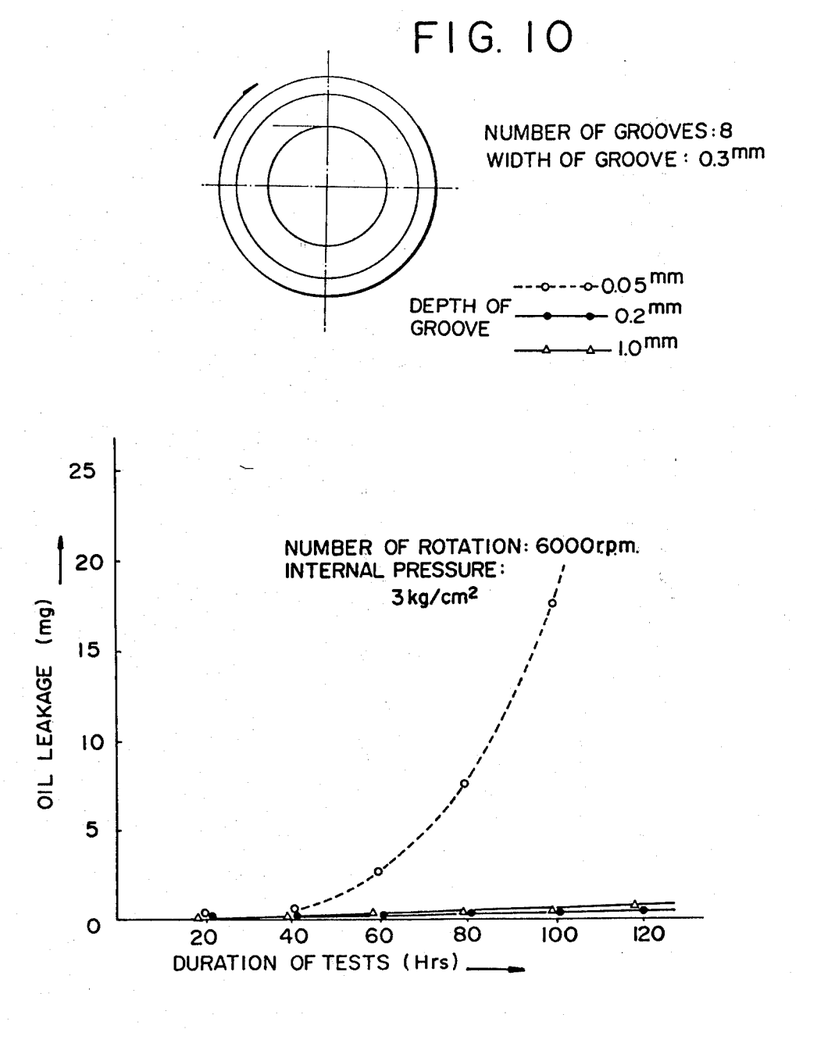
FIGS. 10 to 14 are graphic charts showing the leakages of liquid when the depths of the grooves, widths of the grooves, angles of the grooves, use conditions of sealing sections, and forms of the closed grooves are changed.
Figure 11:
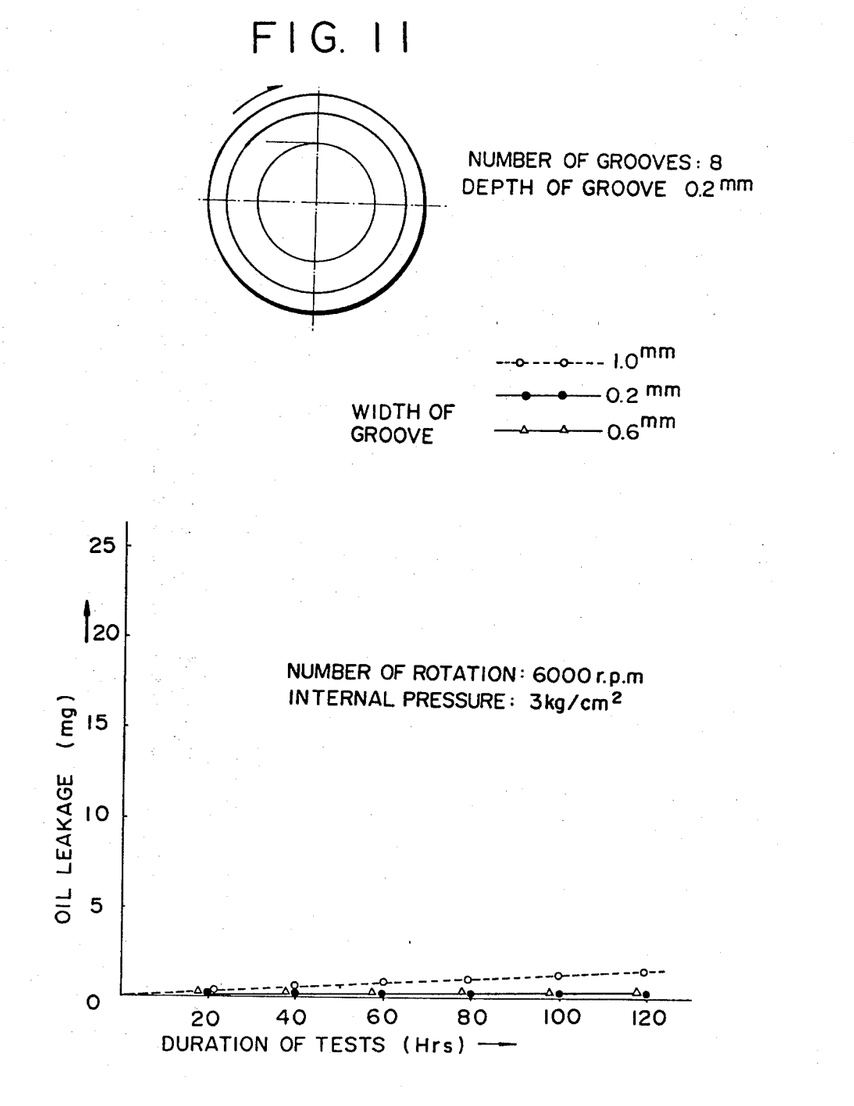

In view of the occurrence of fluid pressure in the grooves, thin and shallow grooves are desirable. However, when the grooves are so shallow that they are easily filled up with the powder of wearing in the rotation of the shaft, it may be meaningless. When the number of grooves are much increased, the above tendency can be avoided to some extent. According to the test results, as shown in FIG. 10, when the depth of the groove is reduced to about 0.05 mm, the sealing effect is reduced. Further, as shown in FIG. 11, the satisfactory sealing effect can be obtained with the grooves having the width of 0.2 to 0.6 mm. Incidentally, these values may be changed according to the area of sliding surface.

(ii) Inclination angle of fine grooves

Figure 12:
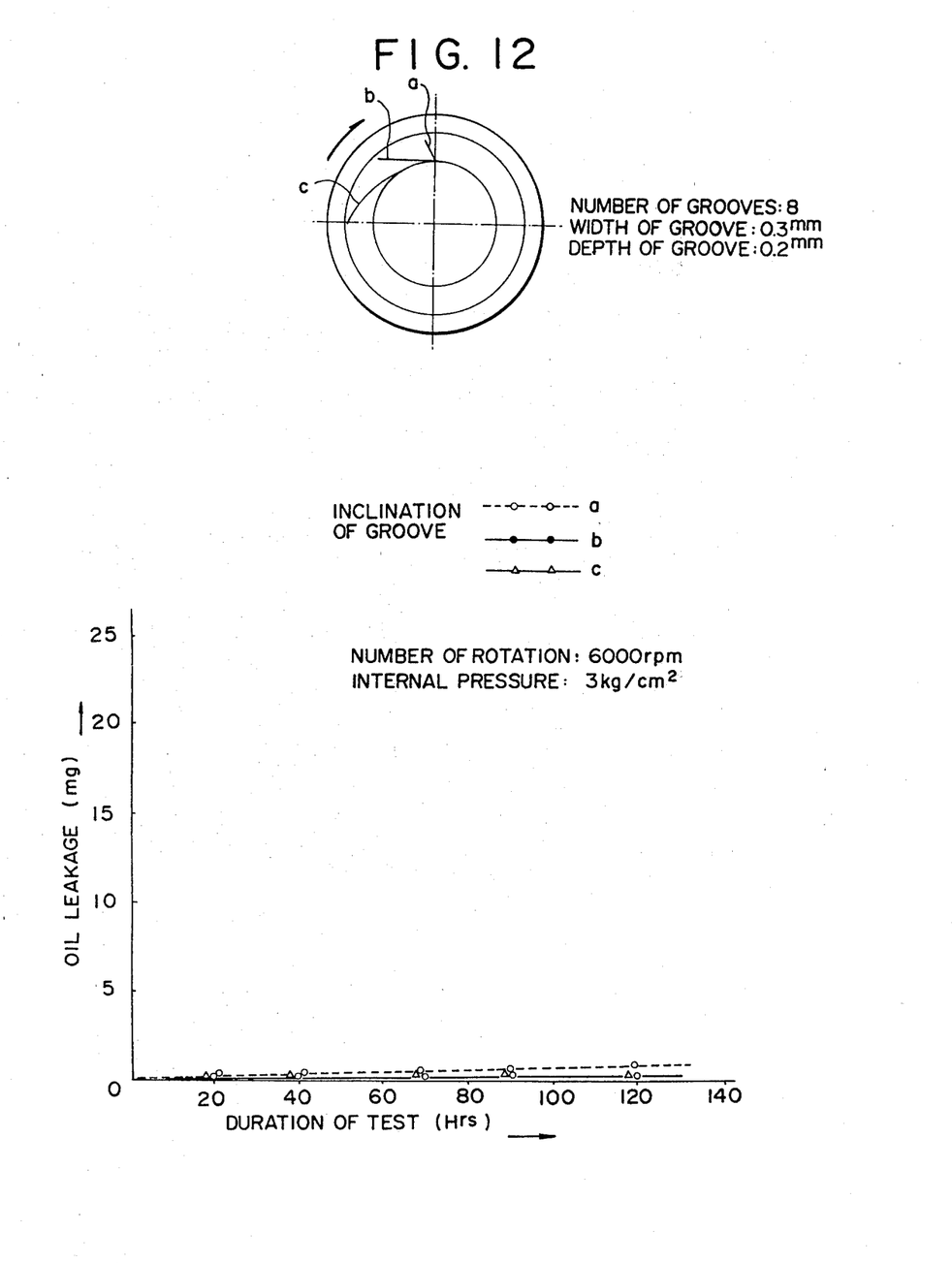

In view of the sealing effect due to the pumping function as described above, the fine grooves are preferably inclined in the outward and rearward direction to the relative rotation of the sealing surfaces. However, in some use conditions, good sealing effect can be expected with the fine grooves shown in FIG. 9. When the fine grooves are arcuate and long to excess (for example, a single spiral groove), the degree of pressure occurrence in each portion of the long groove is too small. Thus such an arcuate groove is not always desirable and further there has been associated with wearing. Within the range of the inclination angle as shown by (a), (b) and (c) of FIG. 12, quite good sealing effect can be obtained. Especially, the case of (b) in the same figure is most excellent.

(iii) Number of fine grooves

Figure 7:
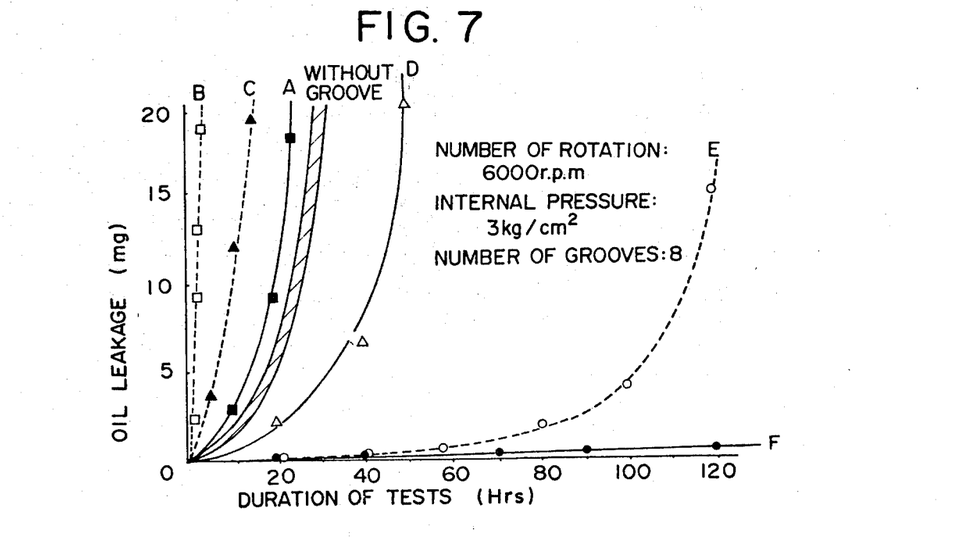
FIG. 7 and FIG. 8 are graphic charts showing the sealing effects of the grooves shown in FIG. 6 while varying the number of the grooves.

As clearly understood from FIGS. 7 and 8, the sealing effect can be improved by increasing the number of fine grooves.

(iv) Use conditions of fine grooves

Figure 13:
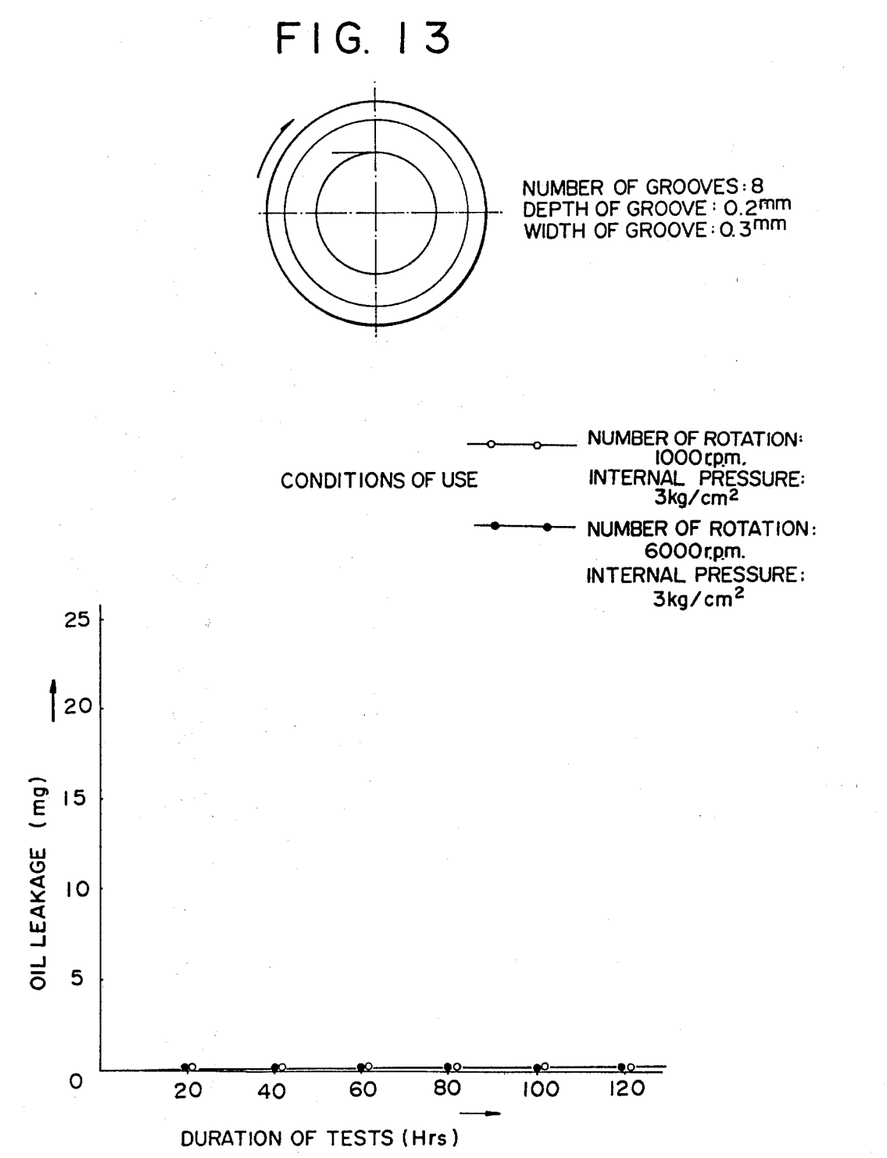

If the above conditions on the configuration of the fine grooves are not changed, the degree of pressure occurrence in the fine groove is determined by the number of rotations (circumferential speed) of the follower ring 10 and the viscosity the fluid being used. Better sealing effect can be obtained with a larger circumferential speed and a larger viscosity. FIG. 13 shows the results of the tests in which the fine grooves were inclined outwardly and rearwardly. Here the configuration of grooves and the kind of fluid were not changed, but the circumferential speed were changed. According to the results, almost complete sealing effect was obtained at both 1,000 r.p.m. and 6,000 r.p.m. Thus, with the grooves of FIG. 13, satisfactory sealing effect can always be expected in common circumferential speeds.

(v) Existence of inside openings of fine grooves (Closed fine grooves)

Figure 14:
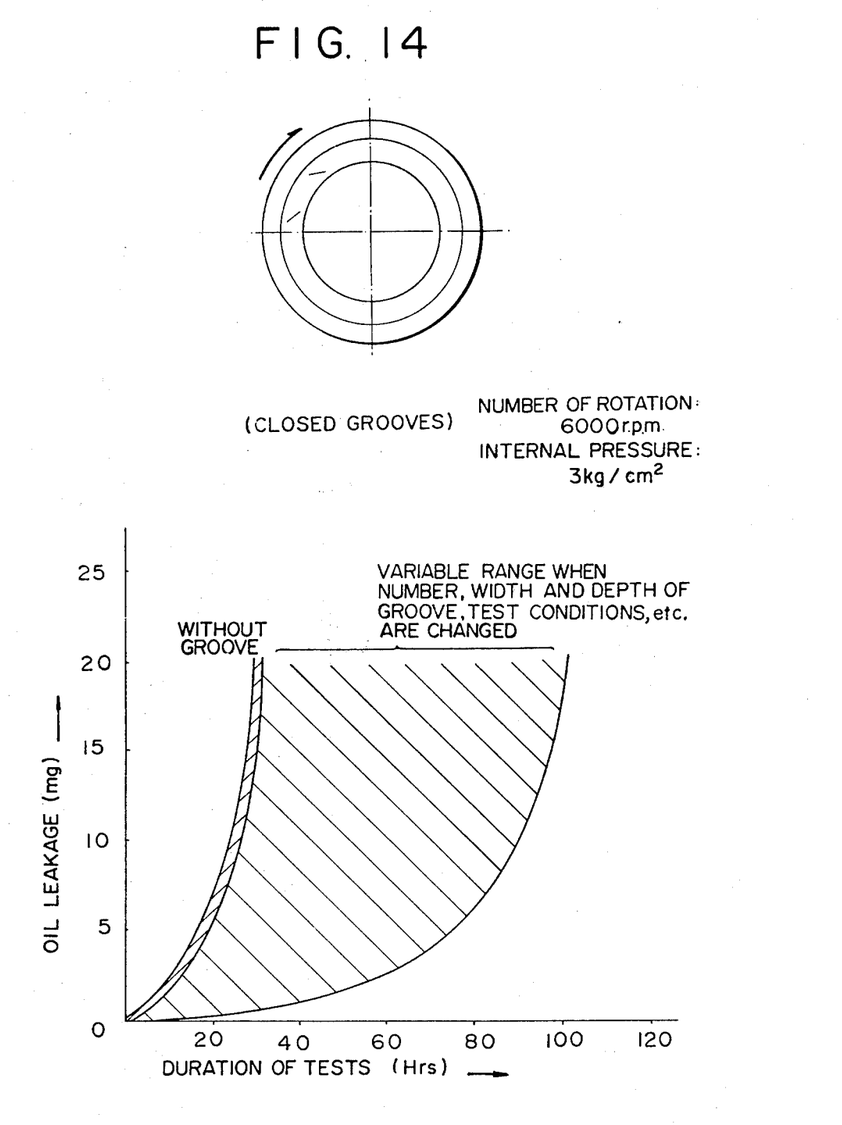

The closed grooves having no inside openings gave considerable sealing effect as compared with the case of no grooves. Tests were carried out by changing the number, width and depth of these closed grooves, the results of which are shown in FIG. 14. In the drawing, the hatched range is the effective area.

Aside from the above-described view points of pumping function and centrifugal function, it is further theorized that the sealing effect by the fine grooves of the present invention depends upon a mechanism involving boundary lubrication between the sliding contact surfaces. In the rotary sliding contact surfaces having no fine grooves of the prior art, any slight ruggedness of the contact surfaces causes unstable lubrication between the sliding contact surfaces resulting in an unevenness of pressure. This unstable pressure unevenness aggravates the leakage. Further, any high pressure is believed to push apart the space between the rotating sliding contact surfaces thereby causing leakage. On the other hand, the fine grooves formed in the relatively rotatable sliding contact surfaces are believed to cause the high pressure portions to communicate with the low pressure portions of pressure unevenness thereby eliminating its effects. As a result, the leakage can be avoided.

Figure 15:
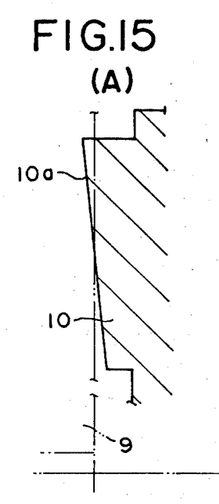
Figure 16:
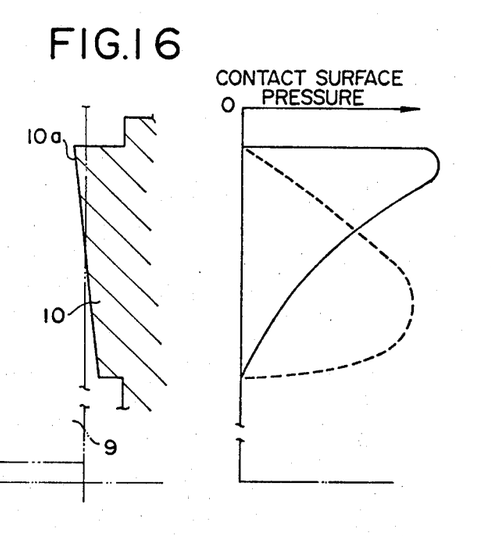
FIG. 16 is a graphic chart showing the distributions of contact surface pressures between sliding contact surfaces.

The above-described fine grooves 15 are formed in order to improve the sealing effect of the follower ring 10 during the rotation of the ring 10. In FIGS. 15 (A) and 15 (B), the exaggerated cross sectional configurations of the follower ring 10 are shown. In order to improve the sealing effect of the follower ring 10 and the seating ring 9 during the stoppage of them, it is preferable to raise the peripheral portions of the side walls of them. That is, the peripheral portion of the side wall of the follower ring 10 that is brought into contact with the seating ring 9, is made somewhat higher than the inside portion of the side wall of the follower ring 10. The degree to raise the peripheral portion of the follower ring 10 may be varied according to the kind of material which is brought into contact, that is, the degree of the raising is, for example, about several microns or less when measured perpendicularly to the contact surface or in parallel to the rotary shaft. With the provision of this raised portion, the contact surface pressure between the peripheral portions of the contact surfaces of the follower ring 10 and the seating ring 9 becomes larger than that of inner portions of the contact surfaces. The distribution of the contact surface pressure is schematically shown by a solid line in FIG. 16. Since the peripheral portions of the contact surfaces have no fine grooves 15 and totally come into contact together, when the contact surface pressure in the peripheral portion is made large enough, the leakage of the fluid from the peripheral portion into the fine grooves of the follower ring 10 during the stoppage of the ring 10, can well be avoided, therefore, the sealing effect during the stoppage can be much improved. It is the common practice in the mechanical seal having no groove in the prior art that the contact surface pressure is increased in the inside region as shown by the dash line of FIG. 16. Further, in order to increase the contact surface pressure in the peripheral portion, the peripheral portion of the seating ring 9 or such portions of both the follower ring 10 and the seating ring 9 can also be raised like the foregoing disclosure.

Figure 17:
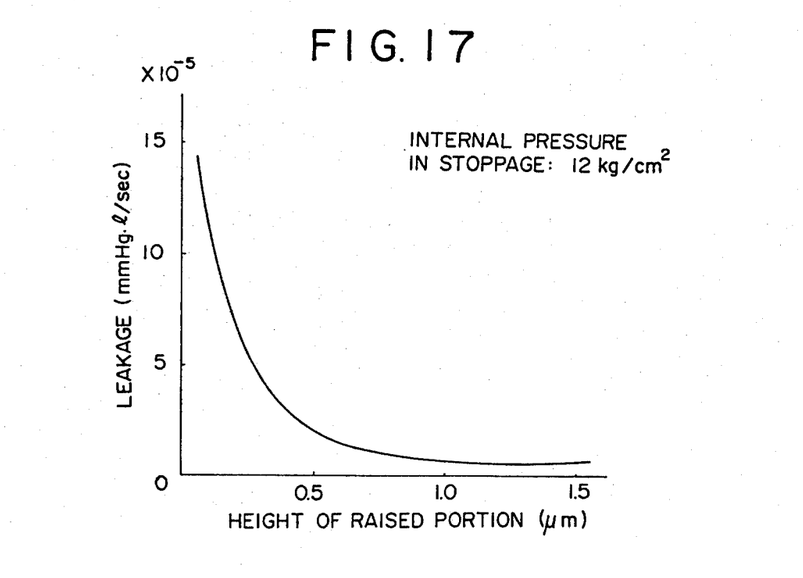
FIG. 17 is a graphic chart showing the relation between the leakage and the degree of raising of the sliding contact surface, during the stoppage of the follower ring.

In the following, the effect of the raised portion of the contact surface will be further described according to the test results. The mechanical seals of a compressor for a car cooler containing a gas and oil (inner pressure: 12 kg/cm$^2$) were tested. Shown in FIG. 17 is the relation between the heights of raised portions of follower rings having fine grooves and the gas leakages per unit time in which the follower rings are stopped. According to the results, the leakage is markedly decreased when the height of the raised portion becomes 0.5 micron and, with the increase of the height, the leakage is further decreased. It should be noted, however, that if the height of the raised portion exceeds a certain value, the sealing effect of the fine grooves during the rotation of the follower ring becomes inferior. In addition, the wearing of the peripheral portion becomes large. Therefore, it is necessary that, in the mechanical seal for the compressor of a car cooler, the height of the raised portion may be not more than several microns.

Lastly, it should be emphasized that the above specific examples are intended as merely illustrative and in no way restrictive of the invention. It is preferred, therefore, that the present invention be limited not by the specific disclosure herein, but only by the appended claims.

What is claimed is:

1. A combination comprising:
   a mechanical seal including stationary means and a follower ring,
   the stationary means including a seating ring which receives therethrough a rotatable shaft and has an annular sliding contact surface,
   the follower ring being mounted to rotate with said rotatable shaft and has another annular sliding contact surface in slidable contact with the sliding contact surface of said seating ring when the shaft is rotated causing relative motion in one direction between said sliding contact surfaces,
   each said annular sliding contact surface having a radially inner portion and a radially outer portion,
   means for sealing a pressurized fluid, which consists of a liquid or a mixture of a gas and a liquid, in a zone radially outside of said follower ring, and
   means for connecting the radially inside surface of said follower ring to inside air,
   at least one of said annular sliding contact surfaces having means cooperative with the other said annular contact surface for avoiding the leakage of said fluid from said outside zone to said inside air, said leakage avoiding means comprising:
   (a) a plurality of grooves in at least one of the annular sliding contact surfaces, said grooves having a closed outer end portion terminating radially short of the outer periphery of said annular sliding contact surface, said grooves having a depth in the range from as low as 0.05 mm up to about 1.0 mm and being less than about 1.0 mm wide, at least some of said grooves having open radially inner ends, said grooves being oriented outwardly from the shaft in a rearward direction with respect to the direction of said relative motion, said grooves extending along a line approximately tangent to the radially inner edge of the corresponding annular sliding contact surface; and
   (b) means for avoiding leakage with the follower ring stopped and formed by an annular, axially raised portion disposed along the periphery of at least one of the sliding contact surfaces, said axially raised portion being defined by a slight swelling of the radially outer circumferential portion of said at least one sliding contact surface in the axial direction beyond the radially inner circumferential portion thereof while maintaining a small clearance between inner circumferential portion of the sliding contact surfaces to hold therebetween a fluid, said raised portion increasing the surface pressure at the radially outer circumferential portion of said slide contact surfaces beyond that at the radially inner circumferential portion, the axial extent of said raised portion being several microns or less, the closed outer ends of said grooves leaving a circumferentially continuous annular surface along said raised portion.

2. The mechanical seal as defined in claim 1, wherein all said grooves have open inner ends and are disposed to inwardly communicate with said inner side.

3. The mechanical seal as defined in claim 1, wherein all said grooves have closed inner end portions.

4. The mechanical seal as defined in claim 1, wherein a portion of said grooves has closed inner ends and a portion of said grooves have open inner ends which inwardly communicate with said inner side.

5. The mechanical seal as defined in claim 1, wherein said grooves have a width in the range of 0.2 to 0.6 mm.

6. The mechanical seal as defined in claim 1, wherein said raised portion is defined on said follower ring.

7. The mechanical seal as defined in claim 1, wherein said grooves are straight.

8. The mechanical seal as defined in claim 1, wherein said grooves are straight and are at an angle of about 90° from the radial direction.

9. The mechanical seal as defined in claim 1, in which said axially raised portion protrudes at least about 0.5 mircron axially beyond the radially inner portion of said sliding contact surface.

* * * * *